United States Patent [19]
Verhoeven

[11] Patent Number: 5,551,652
[45] Date of Patent: Sep. 3, 1996

[54] STANDBY CONTROL SYSTEM

[75] Inventor: Teunes Verhoeven, Long Beach, Calif.

[73] Assignee: McDonnell Douglas Corporation, Long Beach, Calif.

[21] Appl. No.: 219,675

[22] Filed: Mar. 28, 1994

[51] Int. Cl.$^6$ ................................................. B64C 13/30
[52] U.S. Cl. ............................................ 244/220; 244/232
[58] Field of Search .................................... 244/220, 221, 244/229, 232, 233; 74/500.5, 471 R

[56] References Cited

U.S. PATENT DOCUMENTS

| | | | |
|---|---|---|---|
| 3,599,507 | 8/1971 | Exton | 244/233 X |
| 4,170,147 | 10/1979 | Durno et al. | 244/233 X |
| 4,186,622 | 2/1980 | Cooper | 244/233 X |
| 4,198,877 | 4/1980 | Huling | 244/232 X |
| 4,287,788 | 9/1981 | Baetke | 244/233 X |
| 4,540,141 | 9/1985 | Durno et al. | 244/233 X |

FOREIGN PATENT DOCUMENTS

| 219816 | 4/1987 | European Pat. Off. | 244/233 |
|---|---|---|---|

*Primary Examiner*—Galen L. Barefoot
*Attorney, Agent, or Firm*—Henry G. Kohlmann

[57] ABSTRACT

In an aircraft control system a standby cable system which does not significantly affect existing control system friction, but detects when the primary cables are severed and actuates an alternative elevator control mechanism. The standby cable loop of the instant invention consists of two similar type mechanisms located outside the uncontained rotor or propeller shrapnel area. One mechanism attaches to the primary cables and is located forward of the engine and the other is located aft. Each mechanism operates such that negligible friction is added because during normal control motions the standby cable loop does not move, only individual elements input cranks are in motion. The primary cables are provided with an index cable that is routed close to and parallel to the primary cables. In the event the engine shrapnel cuts the primary cables, the index cable will also be cut because of its close proximity to the primary cables and due to the fact it is of smaller size. When the index cable has severed, a spring loaded crank through linkage causes an alternate push-pull cable to be engaged.

12 Claims, 3 Drawing Sheets

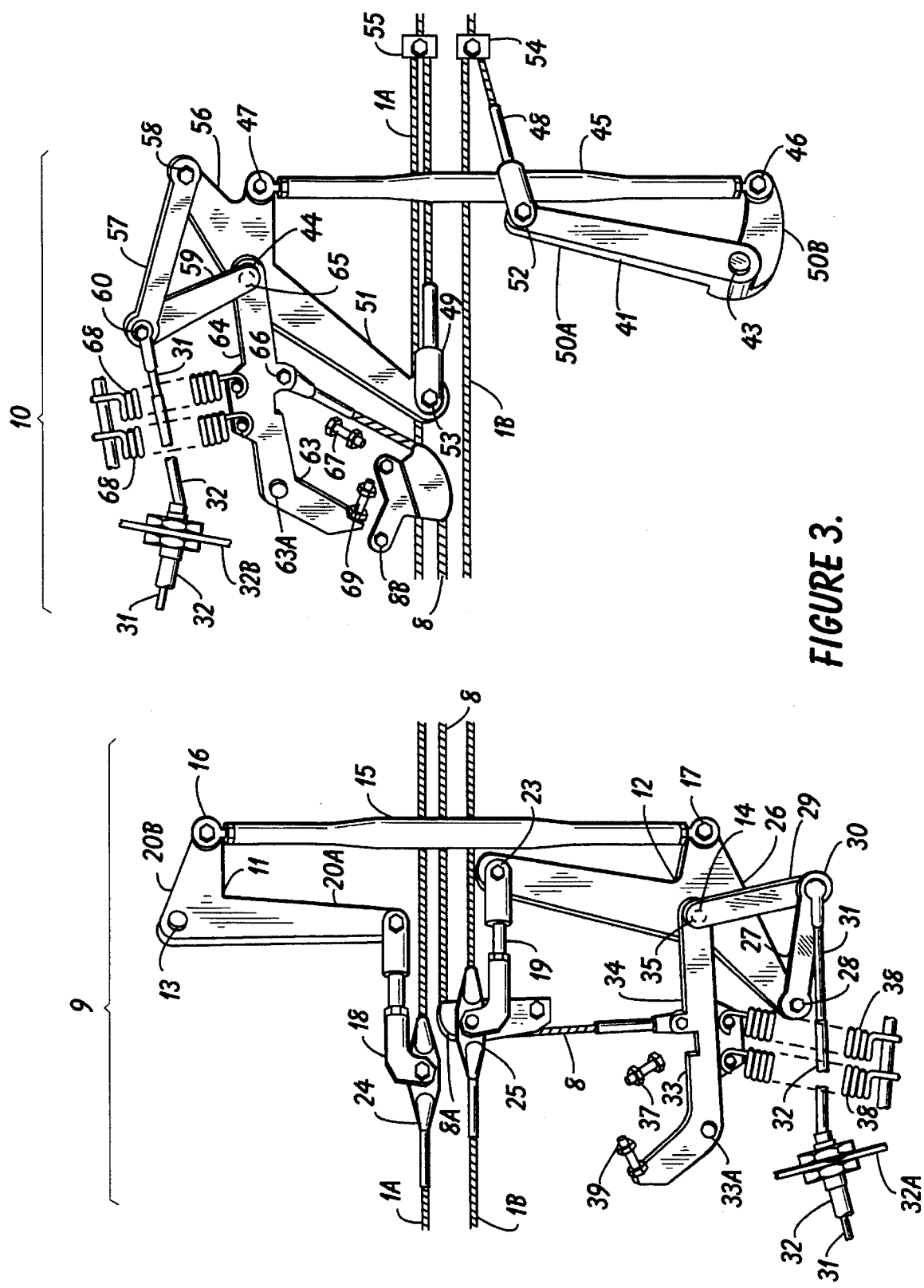

STANDBY CONTROL SYSTEM

BACKGROUND OF THE INVENTION

1. Field of the Invention

This invention relates to the field of redundant cable control and standby control systems. More specifically this invention relates to apparatus which implements a bypass cable control system in the event of primary control system cable failure.

2. Description of the Prior Art

Engine rotor or propeller failure in aircraft can cause debris to fly through the body of the aircraft and sever control cables. Airworthiness authorities have indicated that the catastrophic hazards resulting from such severed control cables are uncertifiable conditions. As a result design precautions must be taken on all new aircraft, and all old aircraft design to minimize the risk from control cable severing. On totally new designed aircraft the solution was to route one cable loop of the redundant loops out of the un-contained debris path, such as routing one of the redundant pair of the primary control cables through the ceiling of the aircraft from the cockpit to the control surfaces while routing the other through the floor. This solution is impractical and costly on derivative aircraft that must meet the certification requirements due not only to the installation practicability, but also due to the adverse effect on the control system, such as break-out friction and control wheel harmony. The prior art is replete with redundant flight control systems of various kinds. These prior art devices are typified by U.S. Pat. No. 4,776,543 to STABLEFORD and U.S. Pat. No. 3,599,507 to EXTON. These prior art devices rely on sensing the severing of the primary cable as the means for sensing failure and then operate with the remaining cable. None of the prior art devices will operate when all of the cables are severed, which is likely when the cables are located in the same region. None of the prior art devices use a separate sensing mechanism and therefore excessive slack in the cable can cause an indication of failure when none has occurred.

BRIEF DESCRIPTION OF THE INVENTION

The instant invention does not affect existing control system friction, yet provides a positive indication when the primary cables are severed and automatically actuates an alternative control mechanism which can easily be installed in the ceiling or any other alternative area. In addition the instant invention does not affect the primary system's load, friction, or hysteresis because it is in a standby mode until required. More importantly the instant invention operates when all of the control cables have been severed. The standby cable loop of the instant invention consists of two similar type mechanisms located outside the uncontained shrapnel area. One mechanism attaches to the primary control cables and is located forward of the engine and the other is located aft. Each mechanism operates such that negligible friction is added because during normal control motions the standby cable loop does not move, only individual elements of the input cranks, as described hereinafter, are in motion. The primary control cables are provided with an index or sense cable that is routed close to and parallel to the primary control cables. In the event the engine shrapnel cuts the primary control cables, the index or sense cable will also be cut because of its close proximity to the primary control cables and due to the fact it is of smaller size. When the index or sense cable has severed, a spring loaded crank through linkage causes an alternate push-pull cable to be engaged. Primary control cable motion is picked up by connection of the alternate cables which move an identical mechanism located aft of the engines. The crank and the push-pull cable attachment are not engaged and will not move during normal operation of the control system. Therefore the standby means of transmitting control commands does not affect the control system with added friction, hysteresis or control harmony. This alternate control system can be used anywhere in an aircraft control system where the alternate standby control path is required if primary paths are subject to damage and where normal operating loads cannot be increased. Most primary and some secondary cable operator control systems are low friction and hysteresis critical.

BRIEF DESCRIPTION OF THE DRAWINGS

FIG. 3 is an orthographic view of the Actuating assembly showing the sense cable severed.

PREFERRED EMBODIMENT

Figure 1:
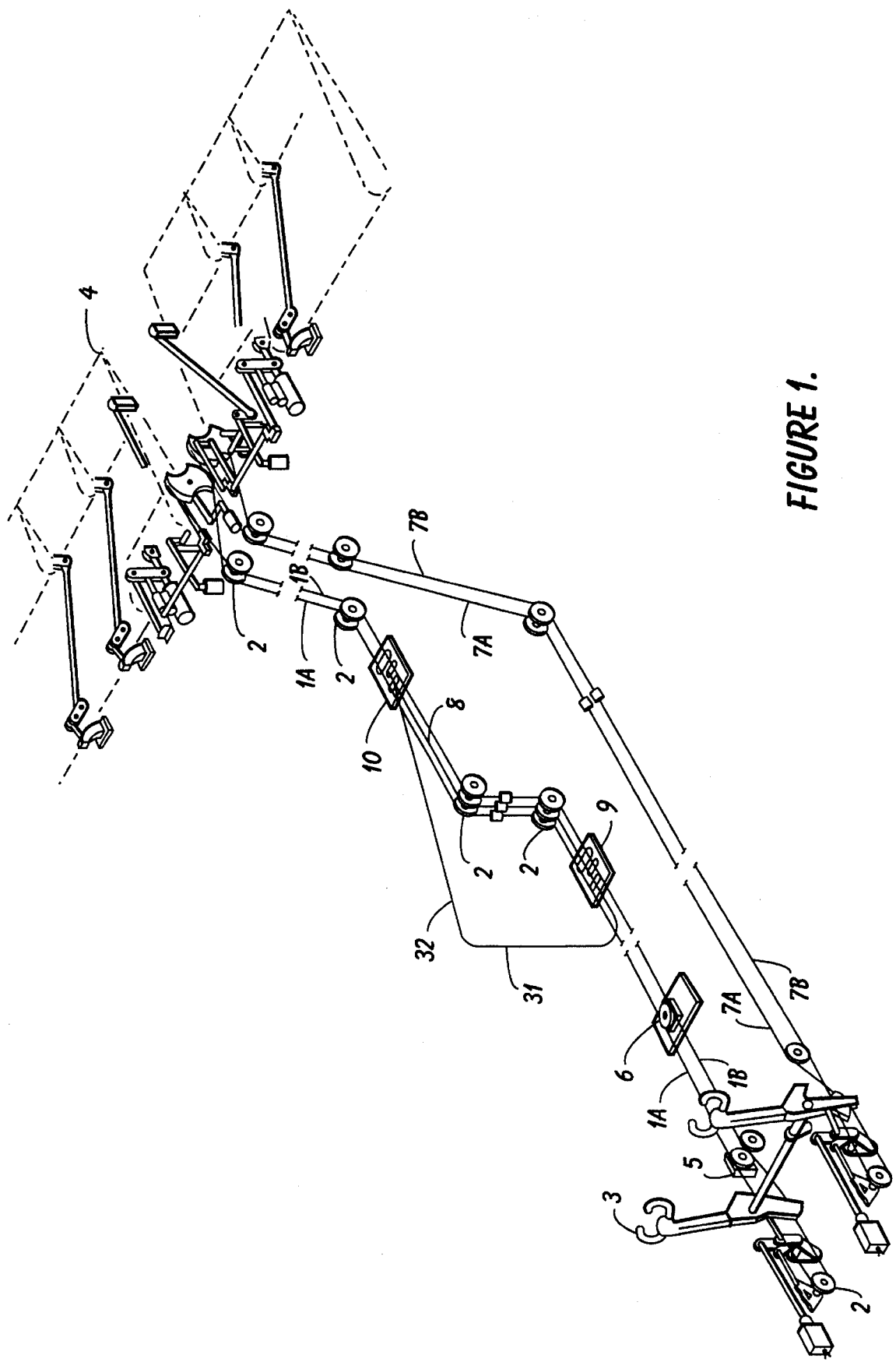
FIG. 1 is a perspective view of the aircraft control system cables and control system elements with the bypass system in place.

Although the instant invention can be utilized for any type of aircraft control system elements, FIG. 1 shows by way of example an implementation on an aircraft elevator control system. Referring to FIG. 1, a first pair of elevator control cables 1a and 1b are shown routed through a system of pulleys 2 between the pilot control stick 3 and the elevators 4. FIG. 1 also shows certain other actuator elements including a stick pusher servo 5 and autopilot servo 6 which are well known in the art and which are not necessary for an appreciation of this invention.

A second pair of elevator control cables 7a and 7b are shown for co-pilot controls and operate in the same manner as control cables 1a and 1b.

FIG. 1 shows a standby loop push pull bypass cable 31 connected between a forward standby assembly 9 and an aft standby assembly 10. FIG. 1 also shows a sense or index cable 8 disposed between the forward standby assembly 9 and an aft standby assembly 10. This cable may be significantly smaller than the control cables because it need only oppose a spring load. While only one bypass cable and standby assembly set is show there may be several installed on each set of control cables at various locations dependent on the location of the engine and the statistical analysis of the likely path of shrapnel in the event of an uncontained rotor or propeller failure. In addition, while the described embodiment utilizes a push-pull cable any manner of linked control would be equivalent such as solid or swivelled links or master slave servo mechanisms.

FIG. 1 also show how the first set of elevator control cables 1 is routed over the engine area and the second set of elevator control cables 7 is routed below the engine area. This particular routing is for aircraft which have engines mounted on the sides of the aircraft toward the rear of the aircraft. This was done so that the two sets of control cables passed the engines and the uncontained shrapnel area. However, on retrofit aircraft the size of the engine projected beyond this area such that the uncontained rotor or propeller failure debris path was well within the common area of the two sets of cables. Rerouting is not practical due to a number of factors including added friction in the control system and the difficulty of routing through overhead compartments in the pressure cabin and general lack of space for pulleys and other required cable mechanisms.

Figure 2:
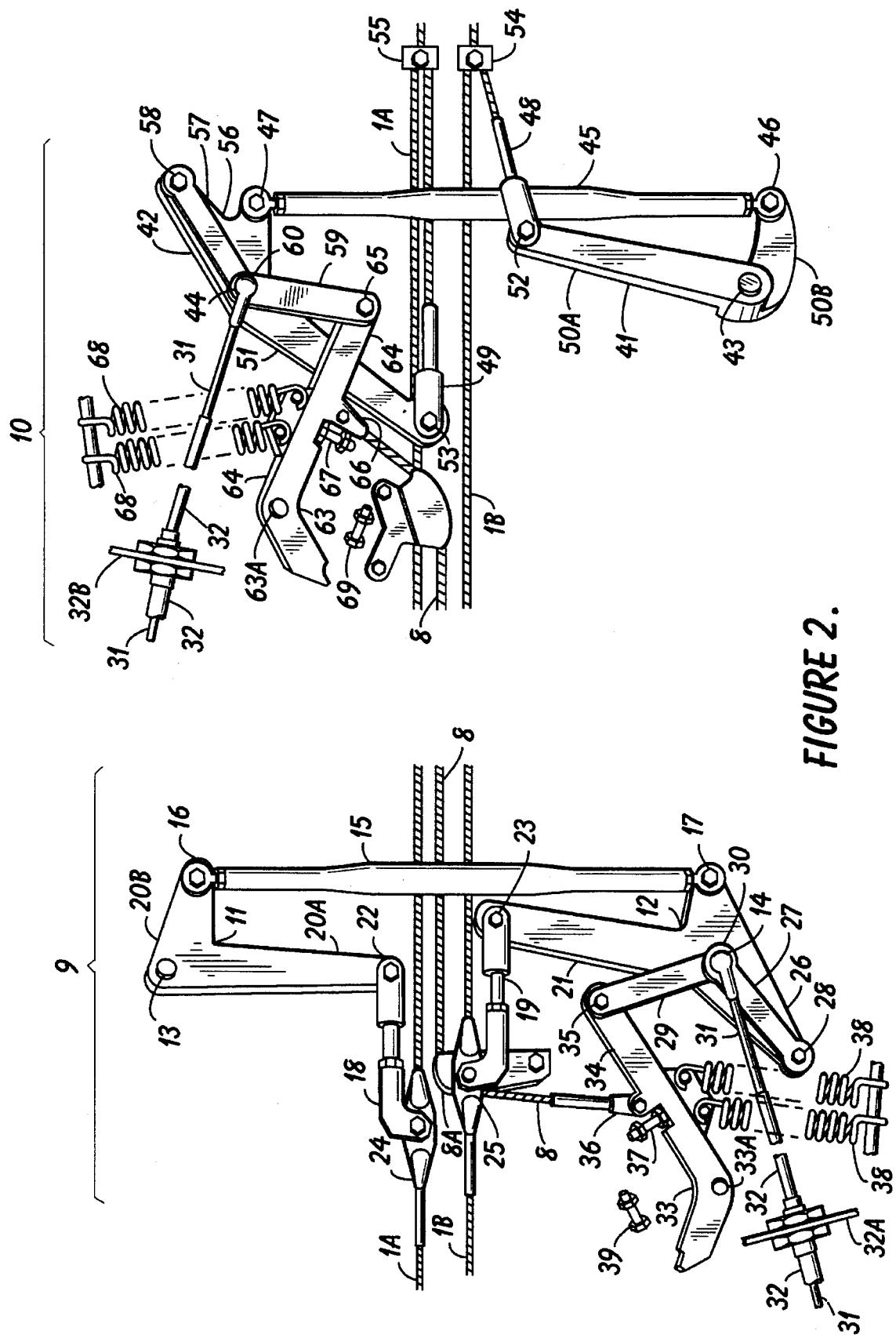
FIG. 2 is an orthographic view of the Actuating assembly showing the sense cable intact.

FIG. 2 shows the position of the various elements of the bypass assemblies 9 and 10 as installed on the aircraft in the standby mode. The bypass assemblies 9 and 10 are identical in operation although slightly different in physical structure due primarily to location. The forward bypass assembly 9 has two primary cranks 11 and 12 which are disposed on either side of the control cables 1a and 1b. Cranks 11 and 12 are each attached to the body of the aircraft through bearings at pivot points 13 and 14 which permits rotation of the cranks about pivot points 13 and 14. The moment arm between pivot points 13 and 16 and between pivot points 14 and 17 are equal in length. Cranks 11 and 12 are linked by a linkage arm 15. This linkage arm 15 is attached to each of the cranks through bearings at pivot points 16 and 17 which permit rotation of the cranks relative to the linkage arm 15. Accordingly, each of the two forward primary cranks rotate concurrently and at the same angular rotation rate.

Each of the cranks 11 and 12 are attached to the control cables 1a and 1b through links 18 and 19 respectively. Links 18 and 19 are generally of equal length. Link 18 is attached to crank 11 at the end of a crank arm 20 through a bearing at pivot point 22 which permits rotation of the crank 11 relative to the link 18. Link 19 is attached to crank 12 at the end of a crank arm 21 through a bearing at pivot point 23 which permits rotation of the crank 12 relative to the link 19. The length of the moment arm between pivot points 13 and 22 and the length of the moment arm between pivot points 14 and 23 are equal. Links 18 and 19 are attached to control cables 1a and 1b respectively at couplings 24 and 25 respectively. Since the crank arms 20 and 21 are disposed toward one another, the motion of the Links 18 and 19 are in opposite directions with the control cables 1a and 1b which also operate in opposite directions as would be expected.

It is important to note that the cranks 11 and 12 always rotate or idle with the operation of the control system without regard to whether or not the sense cable or the control cables have been severed. This adds little in the way of friction or load and has negligible effect on the control system. Additional linkage is required before bypass operation is achieved.

Referring again to FIG. 2, the crank 12 of the forward bypass assembly further comprises a third crank arm 26 which is attached to a first forward link 27 through a bearing at pivot point 28 which permits rotation of link 27 about the pivot point 28. Link 27 is rotatably attached to a second forward link 29 through a bearing at pivot point 30 which permits rotation of link 29 about the pivot point 30. The lengths of the moment arm between pivot points 28 and 30 and between pivot points 28 and 14 are equal. Bearings positioned at pivot points 14 and 30 are positioned along the same rotational axis in the standby mode as shown in FIG. 2. A push pull cable 31 is also attached to link 27 through a bearing at pivot point 30. The housing 32 of the push pull cable 31 is anchored to the body of the aircraft ie. mechanical ground through a mounting bracket 32a.

The opposite end of link 29 is attached to a third crank 33 at one end of a crank arm 34 thereof through a bearing at pivot point 35 which permits rotation of the link 29 about the pivot point 35 relative to the third crank. Link 29 is disposed opposite a connector 36. The sense or index cable 8 is routed over guide 8a and is attached to said crank arm 34 at connector 36 and holds the crank 33 against an adjustable stop 37. Crank 33 is mounted to the body of the aircraft (mechanical ground) through a bearing at pivot point 33a which permits crank 33 to rotate about pivot point 33a. While this particular embodiment uses a sense cable, other sensing means could be used which are equivalent and the invention is not restricted to that specific structure disclosed. A pair of springs 38 are connected to the crank arm 34 opposite connector 36 and bias the crank arm 34 away from the index cable 8 and stop 37. In the event the index or sense cable is severed, the springs 38 will cause the crank 33 to rotate away from adjustable stop 37 and against adjustable stop 39. In the idle position stop 37 should be adjusted such that the pivot point 14 and 30 are superimposed on one another. As crank 12 rotates no change of position of either end of the bypass cable 31 will result. In this position the system is in standby mode and cranks 11 and 12 idle with the movement of the control cables.

The aft bypass assembly 10 has the identical operational elements as described above but due to different locations and slight changes in shape are assigned different numerical designations.

Referring again to FIG. 2, aft bypass assembly 10 also has two crank arms 41 and 42 which are disposed on either side of the control cables 1a and 1b. Cranks 41 and 42 are each attached to mechanical ground through bearings at pivot points 43 and 44 which permit rotation of the cranks about pivot points 43 and 44. The moment arm between pivot points 43 and 46 and between pivot points 44 and 47 are equal in length. Cranks 41 and 42 are linked by an aft linkage arm 45. This aft linkage arm 45 is attached to each of the cranks through bearings at pivot points 46 and 47 which permit rotation of the cranks relative to the linkage arm 45. Accordingly, each of the aft primary cranks 41 and 42 rotate concurrently and at the same angular rotation rate.

Each of the cranks 41 and 42 are attached to the control cables 1a and 1b through aft links 48 and 49 respectively. Links 48 and 49 are generally of equal length. Link 48 is attached to crank 41 at the end of a crank arm 50a through a bearing at pivot point 52 which permits rotation of the crank 41 relative to the link 48. Link 49 is attached to crank 42 at the end of a crank arm 51 through a bearing at pivot point 53 which permits rotation of the crank 42 relative to the link 49. The length of the moment arm between pivot points 43 and 52 and the length of the moment arm between pivot points 44 and 53 are equal. Links 48 and 49 are attached to control cables 1a and 1b respectively at couplings 54 and 55 respectively. Since the crank arms 50a and 51 are generally disposed toward one another, the motion of the Links 48 and 49 are in opposite directions with the control cables 1a and 1b which also operate in opposite directions as would be expected.

As with the forward bypass assembly, cranks 41 and 42 always rotate or idle with the operation of the control system without regard to whether or not the sense cable or the control cables have been severed. This adds little in the way of friction or load and has negligible effect on the control system. Additional linkage is required before actual bypass operation is achieved.

Referring again to FIG. 2, the crank 42 of the forward bypass assembly further comprises a third crank arm 56 which is attached to a first aft link 57 through a bearing at pivot point 58 which permits rotation of link 57 about the pivot point 58. Link 57 is attached to a second aft link 59 through a bearing at pivot point 60 which permits rotation of link 59 about the pivot point 60. The lengths of the moment arm between pivot points 58 and 60 and between pivot point 58 and 44 are equal. Bearings positioned at pivot points 44 and 60 are positioned along the same rotational axis in the standby mode as shown in FIG. 2, which prevents motion of push pull cable 31 which is also attached to link 57 through a bearing at pivot point 60. The housing 62 of the push pull cable 61 is anchored to the body of the aircraft ie. mechanical ground though a mounting bracket 32b.

Link 59 is attached to a third crank 63 at one end of a crank arm 64 thereof through a bearing at pivot point 65 which permits rotation of the link 59 about the pivot point 65 relative to said third crank 63. Link 59 is disposed opposite a connector 66. The sense or index cable 8 is routed over guide 8b and is attached to said crank arm 64 at connector 66 and holds the crank 63 against an adjustable stop 67. Crank 63 is mounted to the body of the aircraft (mechanical ground) through a bearing at pivot point 63a which permits crank 63 to rotate. While this particular embodiment uses a sense cable, other sensing means which are equivalent and the invention is not restricted to that specific structure disclosed. A pair of springs 68 are connected to the crank arm 64 opposite connector 66 and bias the crank arm 64 away from the index cable 8 and stop 67. In the event the index or sense cable is severed, the springs 68 will cause the crank 63 to rotate away from adjustable stop 67 and against adjustable stop 69. In the idle position stop 67 should be adjusted such that the pivot point 44 and 60 are superimposed on one another. As crank 42 rotates no change of position of either end of the bypass cable 61 will result. In this position the system is in standby mode and cranks 41 and 42 idle with the movement of the control cables.

Since the forward and aft mechanisms are reversed, link 48 and link 49 for the aft assembly connect to control cables 1b and 1a respectively which is the reverse of the forward assembly connections of links 18 and 19 respectively.

Since the mechanisms are reversed link 48 and link 49 for the aft assembly connect control cables 1b and 1a respectively which is the reverse of the forward assembly connections.

In addition, the crank 41 in the aft assembly is also a single integrated crank having two arms 50a and 50b but it shaped slightly differently so as to provide clearance for the link 48 to control cable 1b to pass over interconnect link 45 unlike the interconnect link 18 in the forward assembly which does not pass over link 15.

FIG. 3 shows the change in geometry when the index or sense cable 8 is severed. In FIG. 3 the springs 38 in the forward assembly 9, have pulled the crank 33 away from the stop 37 and against stop 39. Crank arm 34 has moved the pivot point 35 to be coaxial with pivot point 14. This has moved pivot point 30 to a position on the apex of a triangle formed by the intersection of links and crank arms at pivot points 28, 30 and 35 which causes rotation at link 29 about pivot point 44 to occur. This causes the push pull cable 31 connected at pivot point 30 to now move concurrently with the motion of the control cables 1a and 1b.

Similarly, in the aft assembly 10, the springs 68 have pulled the crank 63 away from the stop 67 and against stop 69. Crank arm 64 has moved the pivot point 65 to be coaxial with pivot point 44. This has moved pivot point 60 to a position on the apex of a triangle formed by the intersection of links and crank arms at pivot points 58, 60 and 65 which causes rotation about pivot point 14 to occur at pivot point 30. This causes the push pull cable connected at that point to now move concurrently with the motion of the control cables 1a and 1b.

Since the geometry has changed for both the forward assembly 9 and the aft assembly 10, these assemblies will move in concurrence. The severed portions of the cable between the forward and aft assemblies are by passed and the links of both the forward and aft assemblies to the undamaged section of control cable 1a and 1b permit continued operation.

It is important to note that the instant invention does not add appreciable load to the existing control system mechanism which is sensitive to load, friction and hysteresis due to the fact that only a portion of the assemblies are in motion (idling) during standby operation. The various elements of the linkages and cranks must be of sufficient strength to withstand the forces involved in the particular implementation and the length and width thereof may be adjusted accordingly with the width being typically less than overall length of each element. The proportional lengths described herein must be maintained for the linkage to operate.

Having thus described the invention what is claimed is:

1. In a control system utilizing at least one means for actuation of an element of said control system, an actuation means failure recovery system comprising:

a. sensing means adapted for generating a bypass signal on sensing a failure of said actuating means, b. bypass means for bypassing the actuating means, c. at least one apparatus adapted for selectively operating said bypass means adapted for receiving said bypass signal from said sensing means when in a bypass status and coupled to said control system, and d. means for selectively biasing said bypass means into a standby status until failure of said actuating means is sensed.

2. A control system described in claim 1, wherein said bypass means further comprises:

a. a push-pull cable, attached to said means for actuating said control system element.

3. A control system as described in claim 1, wherein said sensing means further comprises:

a. a sensing fibre attached to said selective operating apparatus and disposed adjacent to .the actuating means.

4. A control system as described in claim 1, wherein there are at least two apparatus for selectively operating said bypass means.

5. A control system as described in claim 1, wherein said actuator means further comprises: an actuating cable and said sensing means further comprises:

a sensing cable attached to said selective operating apparatus and disposed adjacent to the actuating cable.

6. A control system described in claim 5, wherein said bypass means further comprises:

a. a mechanical link, attached to said means for actuating said control system element.

7. A control system as described in claim 6, wherein said apparatus for selectively operating said bypass means further comprises:

a. a first crank rotatably attached to mechanical ground at a first crank pivot point, said first crank adapted to rotate about said first crank pivot point, and coupled to said actuating means;

b. a second crank rotatably attached to mechanical ground at a second crank pivot point, said second crank adapted to rotate about said said second crank pivot point and coupled to said actuating means;

c. a linkage arm rotatably attached to said first crank at a first linkage arm pivot point on said first crank and rotatable attached to a second linkage arm pivot point on said second crank, said first linkage arm pivot point and said second linkage arm pivot point each being equal distant from said first crank pivot point and second crank pivot point respectively thereby permitting said first and second cranks to rotate through equal angles in unison;

d. a first link rotatably attached at one end to said second crank at a first link pivot point opposite said second crank pivot point and adapted to rotate about said first link pivot point, e. a second link rotatably attached at a joint first and second link pivot point to said first link at the end thereof opposite said first link pivot point, said second link adapted to rotate about said joint first and second link pivot point, f. a third crank rotatably attached to mechanical ground at a third crank pivot point, said third crank adapted to rotate about said third crank pivot point, said third crank being rotatably attached at one end to the end of said second link at a second link pivot point opposite said joint first and second link pivot point, adapted to rotate about said second link pivot point and coupled to said sense cable at a point located between said third crank pivot point and said second link pivot point and biased away from said sense cable by at least one spring, whereby said selective engagement apparatus engages said bypass means when said sensing means generates a bypass signal.

8. In an aircraft control system utilizing at least one cable for actuating aircraft control surfaces, a control system failure recovery system comprising:

a. a sensing means disposed adjacent to said actuating cable adapted to trigger on severance of said actuating cable, b. a bypass means for bypassing at least part of the actuating cable, c. a first selective engagement apparatus coupled to the sensing means and to said control system adapted for engaging said bypass means on triggering of said sensing means, said selective engagement means positioned along said control system between a potential shrapnel area and the cockpit controls of said control system.

d. a second selective engagement apparatus coupled to the sensing means and to said control system adapted for engaging said bypass means on triggering of said sensing mean positioned along said control system between a potential shrapnel area and the control surfaces being controlled by said control means;

e. a means for biasing each of said first and second selective engagement apparatus into an idle position while said sensing means is not triggered, 9. A control system described in claim 8, wherein said bypass means further comprises:

a. a mechanical link, attached to said selective engagement apparatus and adapted for engagement with said control system.

10. A control system described in claim 8, wherein said bypass means further comprises:

a. a push-pull cable, attached to said means for selectively engaging said control system.

11. An aircraft control system as described in claim 10, wherein said selectively engaging means further comprises:

a. a first crank rotatably attached to mechanical ground at a first crank pivot point, said first crank adapted to rotate about said first crank pivot point, and coupled to said actuating means;

b. a second crank rotatably attached to mechanical ground at a second crank pivot point, said second crank adapted to rotate about said said second crank pivot point and coupled to said actuating means;

a linkage arm rotatably attached to said first crank at a first linkage arm pivot point on said first crank and rotatable attached to a second linkage arm pivot point on said second crank, said first linkage arm pivot point and said second linkage arm pivot point each being equal distant from said first crank pivot point and second crank pivot point respectively thereby permitting said first and second cranks to rotate through equal angles concurrently;

d. a first link rotatably attached at one end to said second crank at a first link pivot point opposite said second crank pivot point and adapted to rotate about said first link pivot point, e. a second link rotatably attached at a joint first and second link pivot point to said first link at the end thereof opposite said first link pivot point, said second link adapted to rotate about said joint first and second link pivot point, f. a third crank rotatably attached to mechanical ground at a third crank pivot point, said third crank adapted to rotate about said third crank pivot point, said third crank being rotatably attached at one end to the end of said second link at a second link pivot point opposite said joint first and second link pivot point, adapted to rotate about said second link pivot point and coupled to said sense cable at a point located between said third crank pivot point and said second link pivot point and biased away from said sense cable by at least one spring, whereby the severing of the sense cable causes said actuating assembly to operatively engage said bypass cable.

12. In an aircraft mechanical control system utilizing control cables for actuating aircraft control surfaces, a control cable failure recovery system comprising:

a. a sensing cable disposed adjacent the actuating cables, b. at least two standby cable actuating assemblies, coupled to each end of the sensing cable each actuating assembly further comprising i. a first crank rotatably attached to mechanical ground at a first crank pivot point, said first crank adapted to rotate about said first crank pivot point, and coupled to said actuating means;

ii. a second crank rotatably attached to mechanical ground at a second crank pivot point, said second crank adapted to rotate about said said second crank pivot point and coupled to said actuating means;

iii. a linkage arm rotatably attached to said first crank at a first linkage arm pivot point on said first crank and rotatable attached to a second linkage arm pivot point on said second crank, said first linkage arm pivot point and said second linkage arm pivot point each being equal distant from said first crank pivot point and second crank pivot point respectively thereby permitting said first and second cranks to rotate through equal angles in unison;

iv. a first link rotatably attached at one end to said second crank at a first link pivot point opposite said second crank pivot point and adapted to rotate about said first link pivot point, v. a second link rotatably attached at a joint first and second link pivot point to said first link at the end thereof opposite said first link pivot point, said second link adapted to rotate about said joint first and second link pivot point, vi. a third crank rotatably attached to mechanical ground at a third crank pivot point, said third crank adapted to rotate about said third crank pivot point, said third crank being rotatably attached at one end to the end of said second link at a second link pivot point opposite said joint first and second link pivot point, adapted to rotate about said second link pivot point and coupled to said sense cable at a point located between said third crank pivot point and said second link pivot point and biased away from said sense cable by at least one spring, vii. a push pull bypass cable and housing having the housing attached to the body of the aircraft and the cable attached to said actuating assemblies at the sixth pivot point, adapted for push pull motion on severing of said sensing cable.

* * * * *